United States Patent
Wang et al.

(10) Patent No.: US 9,075,476 B2
(45) Date of Patent: Jul. 7, 2015

(54) TOUCH SENSING METHODS COMPRISING COMPARISON OF A DETECTED PROFILE FORM OF A SENSING CURVE WITH PREDETERMINED PROFILE FORMS AND DEVICES THEREOF

(75) Inventors: Wan-Qiu Wang, Singapore (SG); Ding Chu, Rolla, MO (US)

(73) Assignee: TPK TOUCH SOLUTIONS (XIAMEN) INC., Xiamen (CN)

( * ) Notice: Subject to any disclaimer, the term of this patent is extended or adjusted under 35 U.S.C. 154(b) by 103 days.

(21) Appl. No.: 13/369,314

(22) Filed: Feb. 9, 2012

(65) Prior Publication Data

US 2013/0044076 A1   Feb. 21, 2013

(30) Foreign Application Priority Data

Aug. 21, 2011   (CN) .......................... 2011 1 0244537

(51) Int. Cl.
*G06F 3/041* (2006.01)
*G06F 3/044* (2006.01)

(52) U.S. Cl.
CPC .... *G06F 3/0418* (2013.01); *G06F 2203/04104* (2013.01); *G06F 3/044* (2013.01)

(58) Field of Classification Search
CPC ...................................................... G06F 3/044
USPC ...................................... 345/173; 178/18.01
See application file for complete search history.

(56) References Cited

U.S. PATENT DOCUMENTS

| | | | |
|---|---|---|---|
| 5,825,352 A | 10/1998 | Bisset et al. | |
| 2010/0053090 A1* | 3/2010 | Hong et al. | 345/173 |
| 2010/0127995 A1 | 5/2010 | Rigazio et al. | |
| 2011/0050615 A1* | 3/2011 | Wu | 345/173 |
| 2011/0057670 A1* | 3/2011 | Jordan | 324/679 |
| 2011/0084924 A1* | 4/2011 | Chang et al. | 345/173 |
| 2011/0084926 A1* | 4/2011 | Chang et al. | 345/173 |
| 2011/0084927 A1* | 4/2011 | Chang et al. | 345/173 |
| 2011/0084928 A1* | 4/2011 | Chang et al. | 345/173 |
| 2011/0084929 A1* | 4/2011 | Chang et al. | 345/173 |
| 2011/0084930 A1* | 4/2011 | Chang et al. | 345/173 |
| 2011/0084931 A1* | 4/2011 | Chang et al. | 345/173 |
| 2011/0084937 A1* | 4/2011 | Chang et al. | 345/174 |

FOREIGN PATENT DOCUMENTS

TW   I269997 B   1/2007

* cited by examiner

*Primary Examiner* — Adam J Snyder
(74) *Attorney, Agent, or Firm* — Gokalp Bayramoglu (57) ABSTRACT

A sensing method for detecting a sensing array is provided. The sensing array comprises at least one sensing row. The sensing method comprises the steps of: obtaining a sensing curve according to a plurality of sensing data signals extracting from the sensing row; determining whether a curve feature of the sensing curve matches one of a plurality of predetermined curve features; and obtaining a touch condition of the sensing row according to the determination result related to the sensing row. A sensing device is further provided. The present invention can reduce the impact of interference noise on detection of a sensing array, and enhance accuracy of detecting a touch condition of the sensing array.

16 Claims, 12 Drawing Sheets

TOUCH SENSING METHODS COMPRISING COMPARISON OF A DETECTED PROFILE FORM OF A SENSING CURVE WITH PREDETERMINED PROFILE FORMS AND DEVICES THEREOF

BACKGROUND OF THE INVENTION

This application claims the benefit of China application No. 201110244537.9, filed on Aug. 21, 2011.

1. Field of the Invention

The invention relates to touch sensing technique, and more particularly to a touch sensing method and touch sensing device for a sensing array.

2. Description of the Related Art

Figure 1:
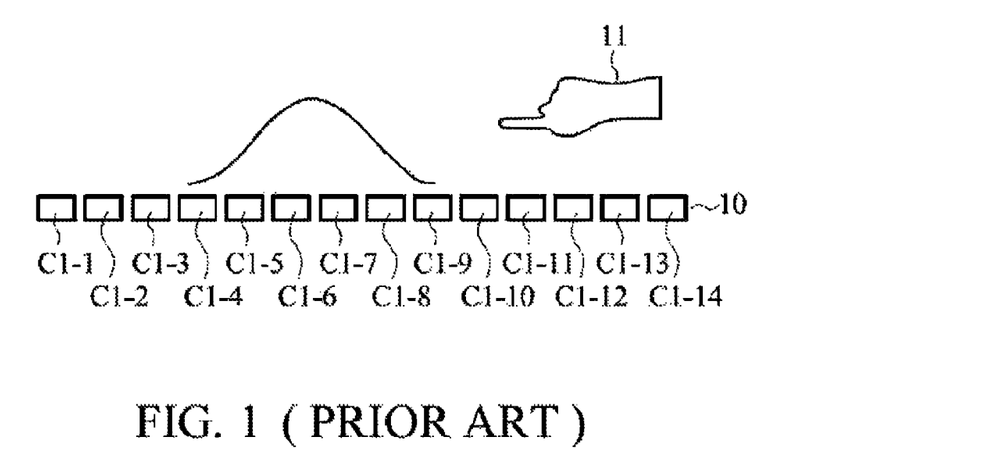
FIG. 1 shows a sensing row of a touch sensing array which has been touched by a single object.
Figure 2:
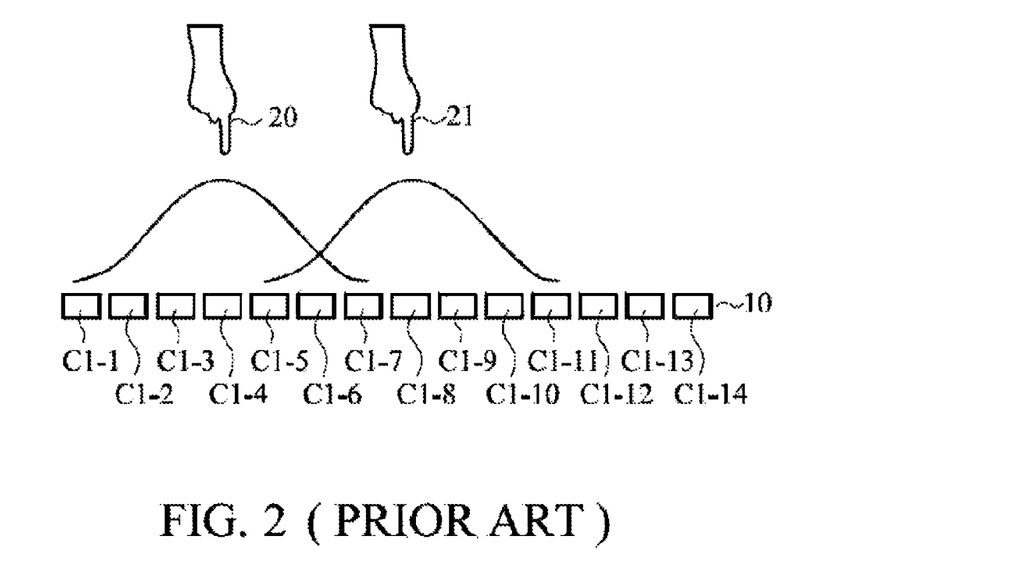
FIG. 2 shows a sensing row of a touch sensing array which has been touched by two objects.

FIG. 1A shows a sensing row of a touch sensing array, which has been touched by one single object. Referring to FIG. 1A, a sensing row 10 comprises a plurality of sensing cells C1-1~C1-14 disposed in a line. Generally, one touch sensing operation for the sensing row 10 causes one series of sensing data signals read from the sensing row 10. For example, when one single object 11 (such as a finger, that is one single touch point) touches a position near the sensing cells C1-6 and C1-7 in the sensing row 10, the intensity of the sensing data signals read from the sensing cells C1-1~C1-14 can be represented by a Gaussian Curve. In some applications, the sensing row 10 may be touched by a plurality of objects. Referring to FIG. 2, one object 20 touches a position near the sensing cells C1-4 in the sensing row 10, while another object touches a position near the sensing cells C1-8 in the sensing row 10. The intensity of the sensing data signals read from the sensing cells C1-1~C1-14 can be represented by two Gaussian Curves.

In prior arts, according to Gaussian Curve, real data generated when the sensing row 10 is touched can be distinguished from interference noise. Generally, a minimum threshold value is set to determine read data. However, if the touched area on the sensing row 10 is relatively small, the real data generated when the sensing row 10 is touched, may be treated as the interference noise. Thus, in this situation, the setting of the minimum threshold value for Gaussian Curve becomes a moot purpose.

Thus, it is desired to provide a touch sensing method and touch sensing devices that can accurately detect a touch condition of a sensing array, such as a position of an object touching the sensing array.

BRIEF SUMMARY OF THE INVENTION

An exemplary embodiment of a sensing method for detecting a sensing array is provided. The sensing array comprises at least one sensing row. The sensing method comprises the following steps of: obtaining a sensing curve according to a plurality of sensing data signals extracting from the sensing row; determining whether a curve feature of the sensing curve matches with one of a plurality of predetermined curve features; and obtaining a touch condition of the sensing row according to the determination result related to the sensing row.

In some embodiments, the plurality of sensing data signals represent capacitance values related to a plurality of sensing cells of the sensing row. Moreover, the touch condition of the sensing row comprises at least one of: whether the sensing row has been touched by at least one object, the number of objects touching the sensing row, a position of at least one object in the sensing row when the at least one object touches the sensing row, and/or a touch area in the sensing row when at least one object touches the sensing row.

An exemplary embodiment of a sensing device for detecting a sensing array is provided. The sensing array comprises at least one sensing row. The sensing device comprises a calculation unit, a determination unit, and a detection unit. The calculation unit obtains a sensing curve according to a plurality of sensing data signals extracting from the sensing row. The determination unit determines whether a curve feature of the sensing curve matches with one of a plurality of predetermined curve features. The detection unit obtains a touch condition of the sensing array, according to the determination result, related to the selected sensing row. In some embodiments, the plurality of sensing data signals represent capacitance values related to the plurality of sensing cells of the sensing row. Moreover, the calculation unit calculates the difference between every two sensing data signals among the plurality of sensing data signals to obtain a plurality of differential values, and the determination unit obtains the sensing curve according to the plurality of differential values.

In some other embodiments, the touch condition of the sensing row comprises at least one of: whether the sensing array has been touched by at least one object, the number of objects touching the sensing array, a coordinate of at least one object in the sensing array when the at least one object touches the sensing array, and/or a touch area in the sensing row when at least one object touches the sensing row.

According to a touch sensing device and a touch sensing method, a feature of a sensing curve related to a sensing row to be detected can be compared with predetermined curve features. By the comparison of the curve features, the Impact of interference noise on detection of a sensing array can be reduced, and accuracy of detecting a touch condition of the sensing array can be enhanced.

A detailed description is given in the following embodiments with reference to the accompanying drawings.

BRIEF DESCRIPTION OF THE DRAWINGS

The invention can be more fully understood by reading the subsequent detailed description and examples, with references made to the accompanying drawings, wherein.

DETAILED DESCRIPTION OF THE INVENTION

The following description is of the best-contemplated mode of carrying out the invention. This description is made for the purpose of illustrating the general principles of the invention, and should not be taken in a limiting sense. The scope of the invention is best determined by reference to the appended claims.

Figure 3:
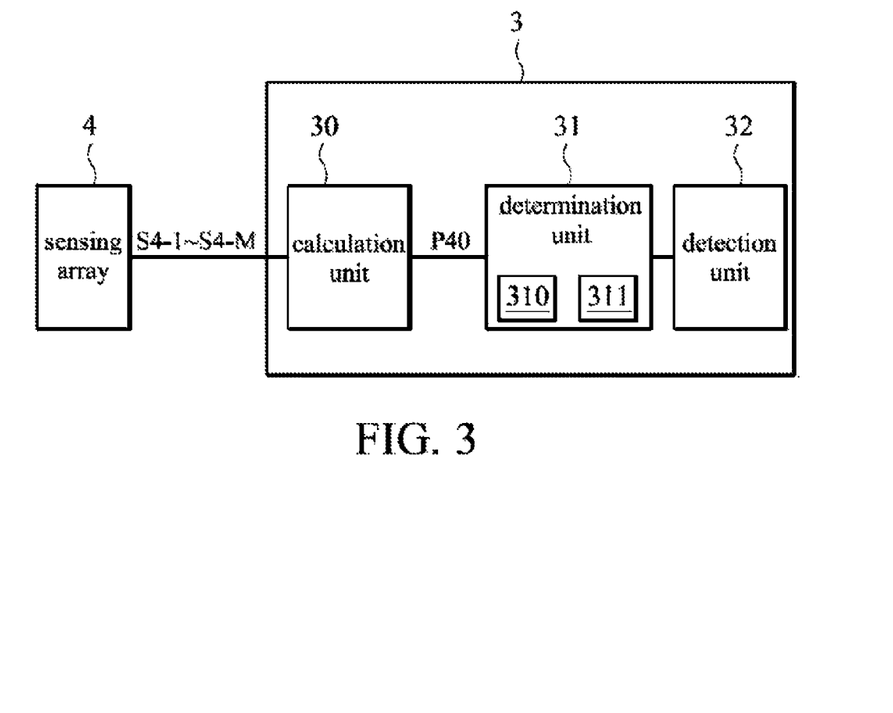
FIG. 3 shows an exemplary embodiment of a sensing device.
Figure 4:
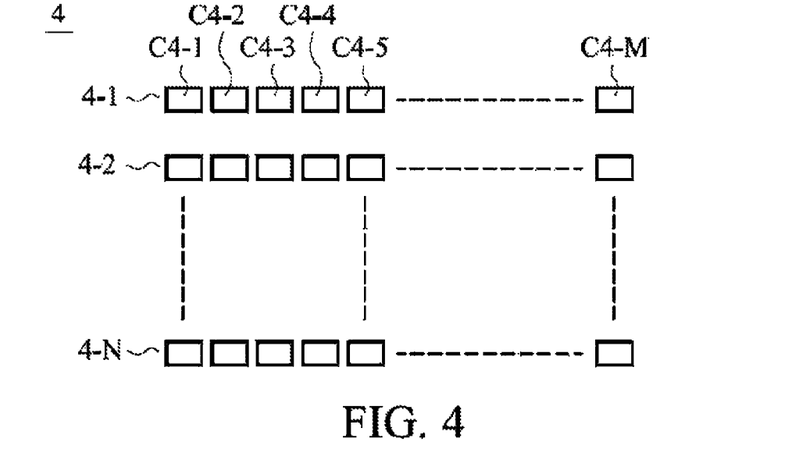
FIG. 4 shows an exemplary embodiment of a sensing array in FIG. 3.

FIG. 3 shows an exemplary embodiment of a sensing device. Referring to FIG. 3, a sensing device 3 detects a touch condition applied to a sensing array 4. FIG. 4 shows an exemplary embodiment of a sensing array in FIG. 3. As shown in FIG. 4, the sensing array 4 comprises sensing rows 4-1~4-N (N is a positive integer), and each sensing row comprises a plurality of cells. For example, the sensing row 4-1 comprises sensing cells C4-1~C4-M (M is a positive integer). The sensing device 3 comprises a calculation unit 30, a determination unit 31, and a detection unit 32. The determination unit 31 comprises a memory 310 for storing differential types of predetermined curve features and a curve processor 311. In the embodiment, the predetermined curve features are profile forms, and the profile forms are obtained according to differential values that are not affected by interference noise.

Figure 5A:
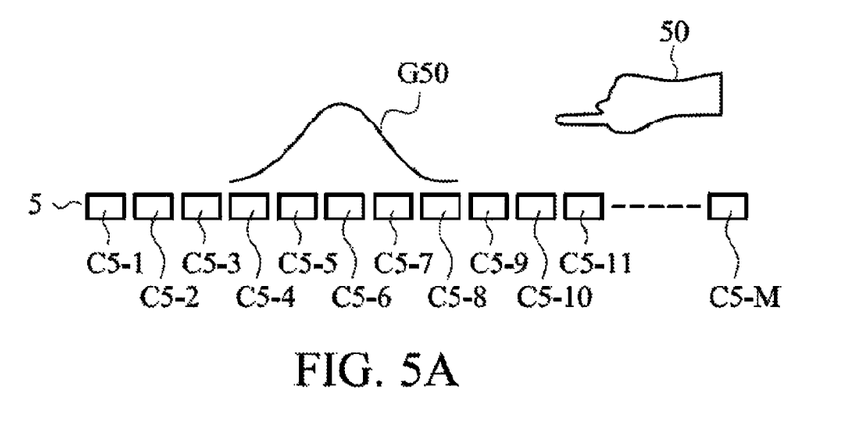
FIGS. 5A-5C show a touch condition of a sensing row, differential values and a profile form corresponding to the touch condition.
Figure 5B:
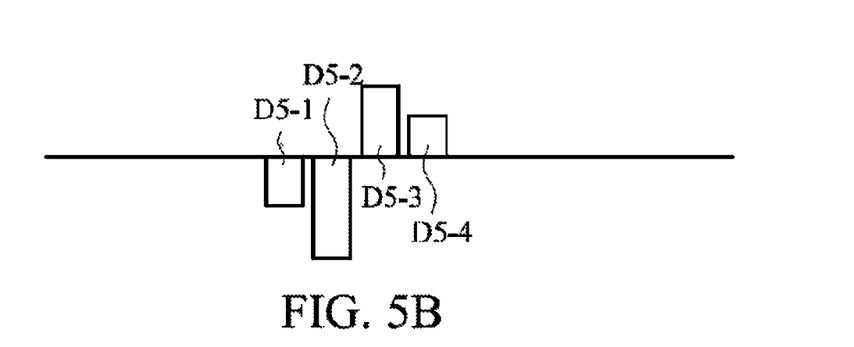
Figure 5C:
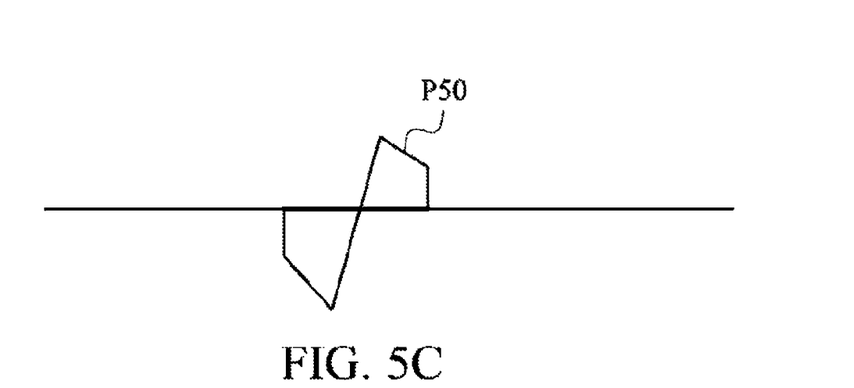

FIGS. 5A~5C show a touch condition of a sensing row and differential values, and a profile form corresponding to the touch condition. FIG. 5A shows a touch condition of a sensing row 5. Assume that the sensing row 5 has a plurality of sensing cells C5-1~C5-M. In a case that the detection of the touch condition is not affected by interference noise, when one single object 50 (such as a finger, that is one single touch point) touches a position corresponding to the sensing cell C5-6 in the sensing row 5, the intensity of the sensing data signals read from the sensing cells C5-1~C5-M can be represented by a Gaussian Curve G50. At this time, a plurality of differential values is obtained according to the difference between every two sensing data signals among the sensing data signals. The differential values D5-1~D5-4 shown in FIG. 5B are the meaningful differential values when one single object 50 touches the sensing row 5. For example, the differential value D5-1 is the difference between the sensing data signals of the sensing cells C5-5 and C5-6, and the differential value D5-2 is the difference between the sensing data signals of the sensing cells C5-6 and C5-7. A sensing curve P50 are obtained from the differential values D5-1~D5-4, as shown in FIG. 5C.

In the embodiment, the profile forms can be represented by the following six geometry symbols:

(1) Regular triangle ▲: represents a full range, wherein corresponding differential values are all positive, and the differential values are increased and then decreased from the left to the right of the profile form.

(2) Inverted regular triangle ▼: represents full range, wherein corresponding differential values are all negative, and the differential values are decreased and then increased from the left to the right of the profile form.

(3) Right-angled triangle ◣: represents a half range, wherein corresponding differential values are all positive, and the differential values are decreased from the left to the right of the profile form.

(4) Inverted right-angled triangle ◤: represents a half range, wherein corresponding differential values are all negative, and the differential values are increased from the left to the right of the profile form.

(5) Two regular triangles ▲▲: represents two peak points of two full ranges, wherein corresponding differential values are all positive.

(6) Two inverted regular triangles ▼▼: represents two peak points of two full ranges, wherein corresponding differential values are all negative.

Referring to FIGS. 5B~5C, when one single touch point occurs (that is the touching of one single object 50), two negative differential values D5-1~D5-2 and two positive values D5-3 and D5-4 are generated. In this case, a profile form of a sensing curve P50 obtained from the differential values D5-1~D5-4 is represented by ◤◣.

Figure 6A:
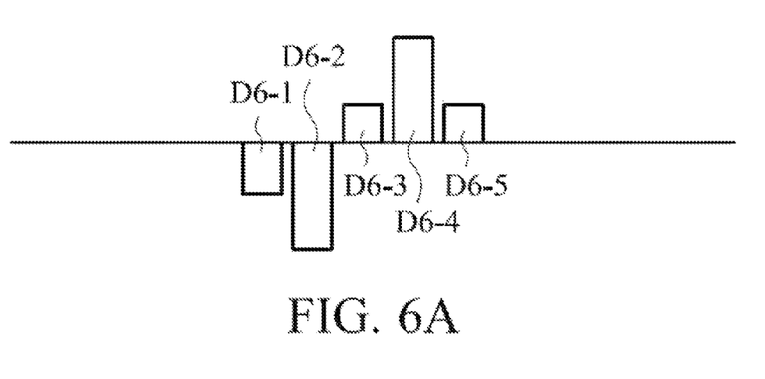
FIGS. 6A~6B, 7A~7B, 8A~8B, 9A~9B, 10A~10B, and 11A~11B show differential values and corresponding profile forms in differential types.
Figure 6B:
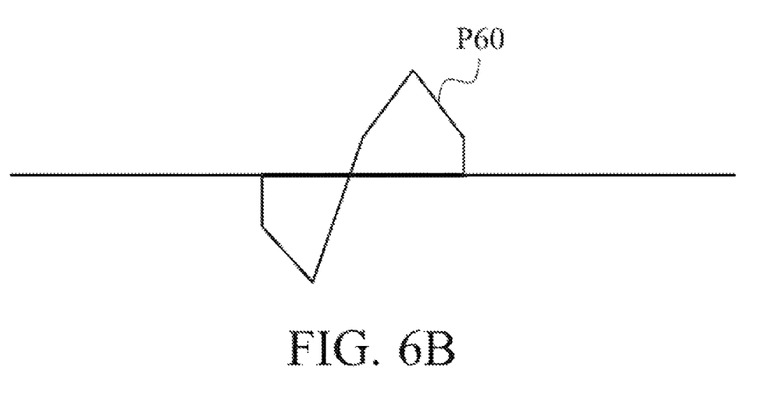

Referring to FIGS. 6A~6B, a series of differential values and a corresponding profile form in another type are shown. When one single touch point occurs, two negative differential values D6-1~D6-2 and three positive values D6-3 and D6-5 are generated. In this case, a profile form of a sensing curve P60 obtained from the differential values D6-1~D6-5 is represented by ◤▲.

Figure 7A:
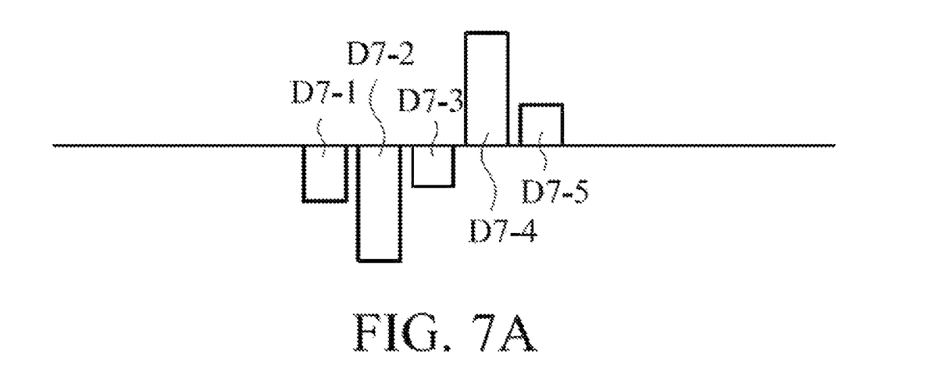
Figure 7B:
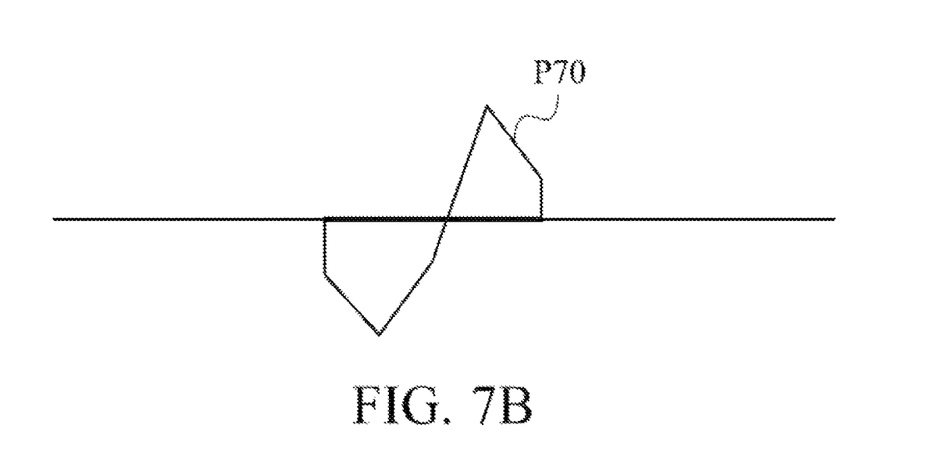

Referring to FIGS. 7A and 7B, a series of differential values and a corresponding profile form in another type are shown. When one single touch point occurs, three negative differential values D7-1~D7-3 and two positive values D7-4 and D7-5 are generated. In this case, a profile form of a sensing curve P70 obtained from the differential values D7-1~D7-5 is represented by ▲◣.

Figure 8A:
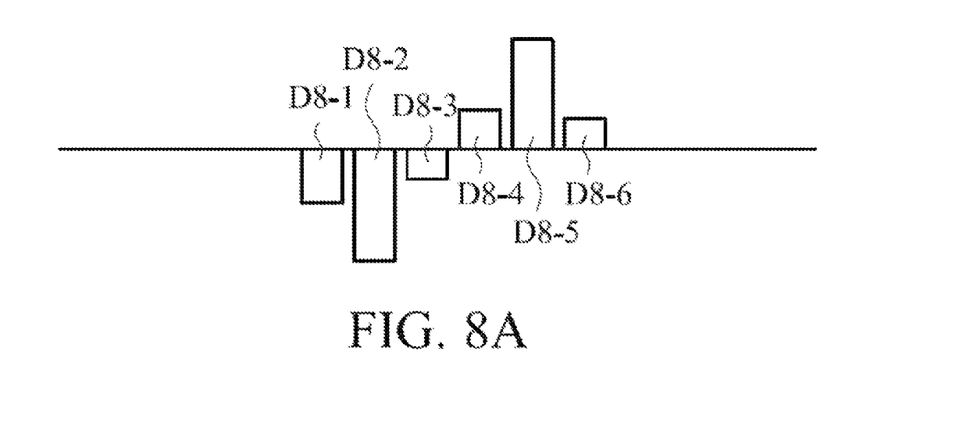
Figure 8B:
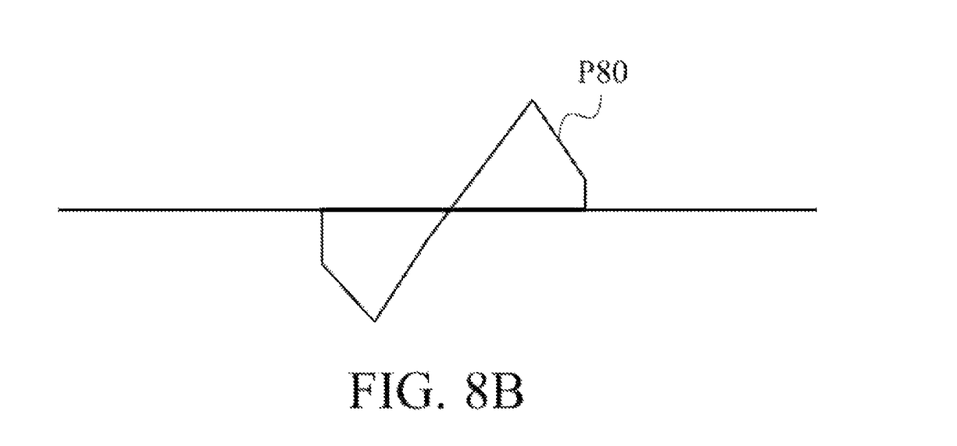

Referring to FIGS. 8A and 8B, a series of differential values and a corresponding profile form in another type are shown. When one single touch point occurs, three negative differential values D8-1~D8-3 and three positive values D8-4 and D8-6 are generated. In this case, a profile form of a sensing curve P80 obtained from the differential values D8-1~D8-6 is represented by ▲▼.

Figure 9A:
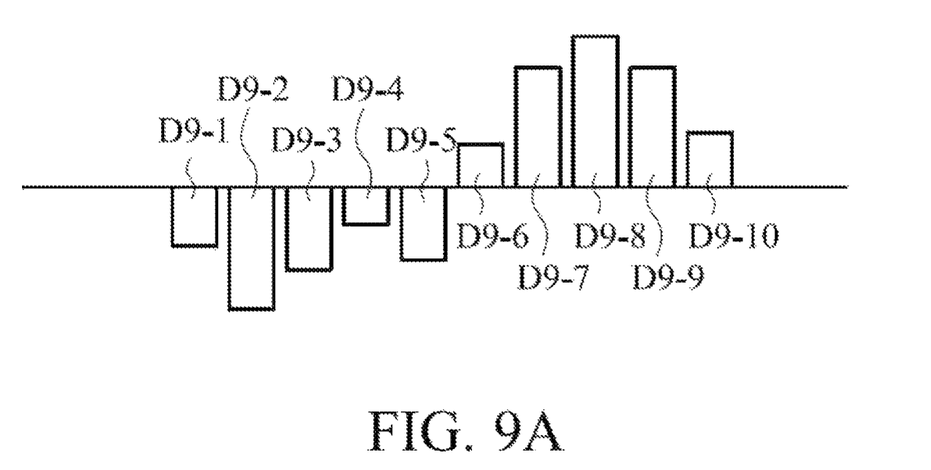
Figure 9B:
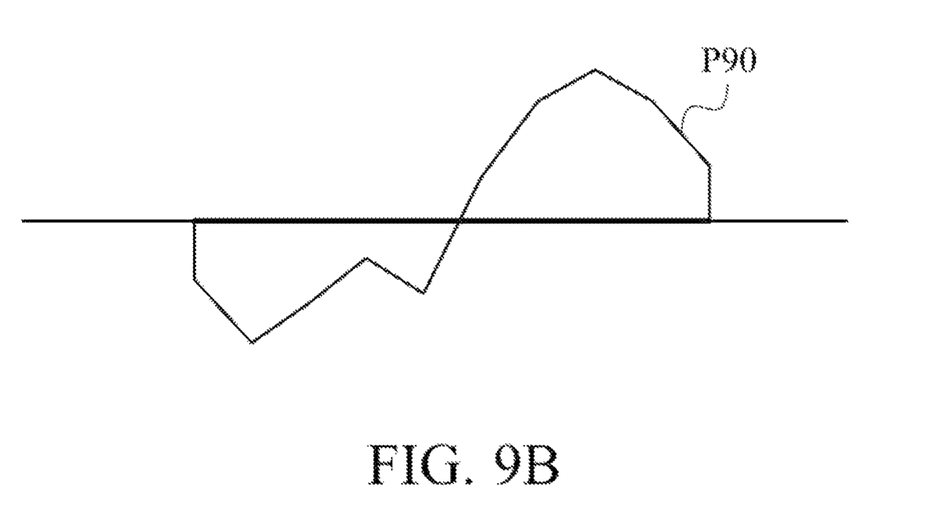

Referring to FIGS. 9A and 9B, a series of differential values and a corresponding profile form in another type are shown. When two touch points occur, five negative differential values D9-1~D9-5 and five positive values D9-6 and D9-10 are generated. In this case, a profile form of a sensing curve P90 obtained from the differential values D9-1~D9-10 is represented by ▼▼▲. According to FIG. 9B, there are two peak points in the front half of the curve respectively corresponding to the differential values D9-2 and D9-5.

Figure 10A:
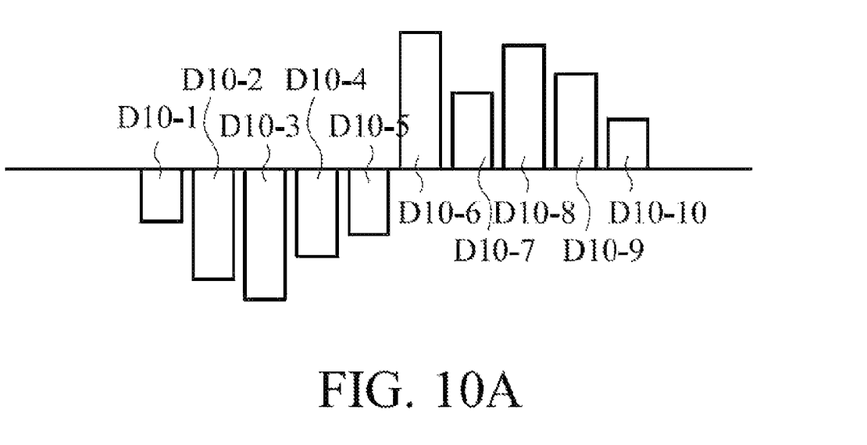
Figure 10B:
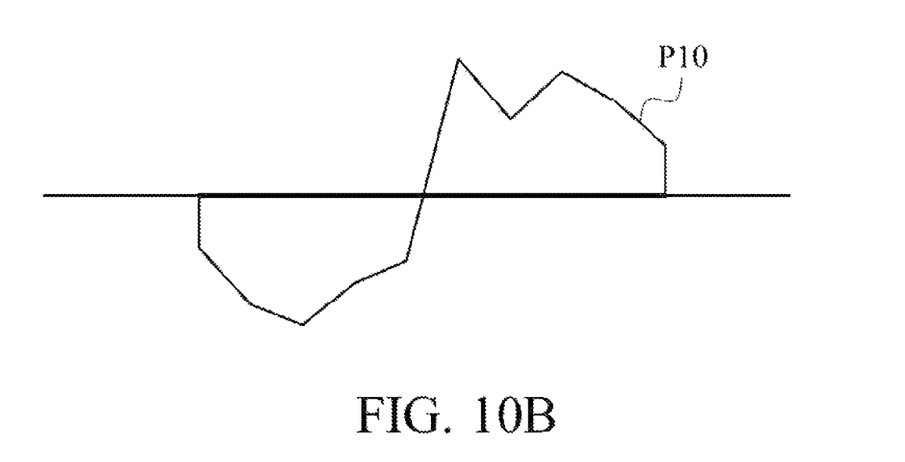

Referring to FIGS. 10A and 10B, a series of differential values and a corresponding profile form in another type are shown. When two touch points occur, five negative differential values D10-1~D10-5 and five positive values D10-6 and D10-10 are generated. In this case, a profile form of a sensing curve P10 obtained from the differential values D10-1~D10-10 is represented by ▼▲▲. According to FIG. 10B, there are two peak points in the back half of the curve respectively corresponding to the differential values D10-6 and D10-8.

Figure 11A:
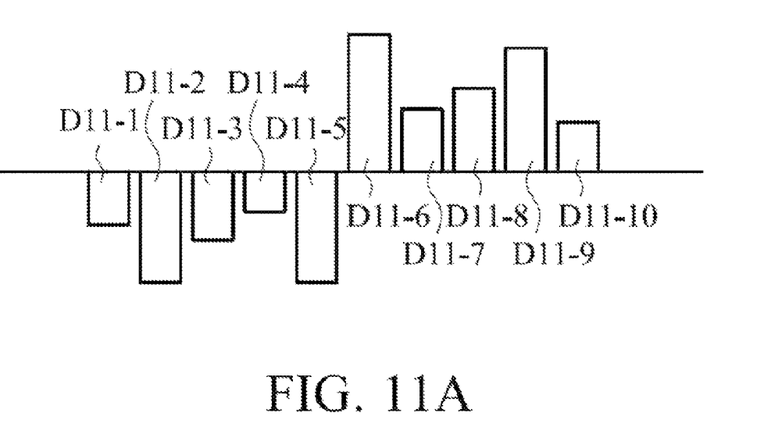
Figure 11B:
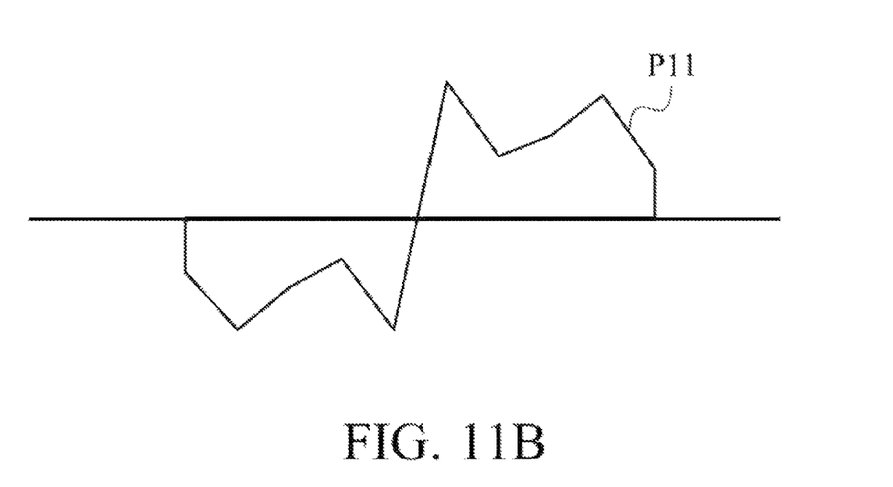

Referring to FIGS. 11A and 11B, a series of differential values and a corresponding profile form in another type are shown. When two touch points occur, five negative differential values D11-1~D11-5 and five positive values D11-6 and D11-10 are generated. In this case, a profile form of a sensing curve P11 obtained from the differential values D11-1~D11-10 is represented by ▼▼▲▲. According to FIG. 11B, there are two peak points in the front half of the curve respectively corresponding to the differential values D11-2 and D11-5, and there are two peak points in the back half of the curve respectively corresponding to the differential values D11-6 and D11-9.

The memory 310 of the determination unit 31 at least stores the profile forms P50, P60, P70, P80, P90, P10, and P11 of FIGS. 5B, 6B, 7B, 8B, 9B, 10B, and 11B in advance to serve as predetermined profile forms.

Figure 12:
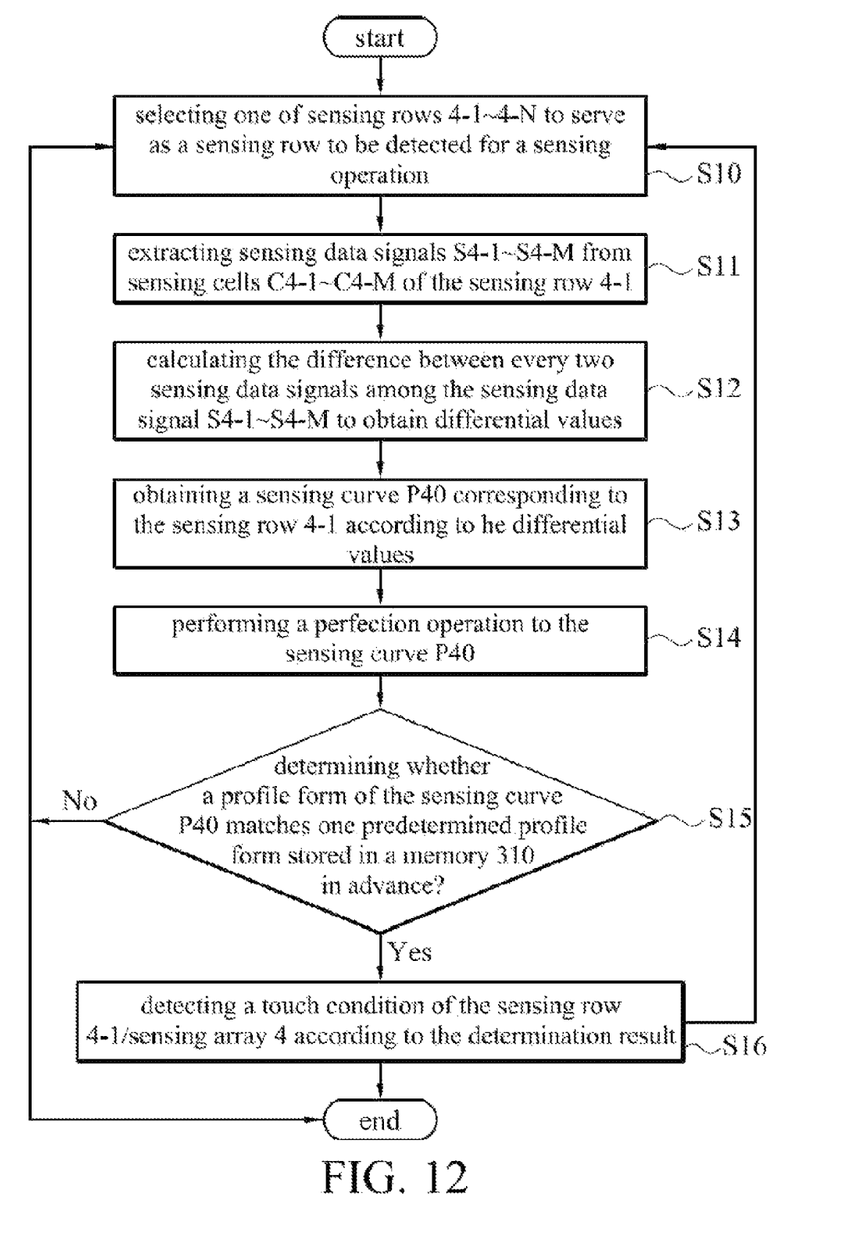
FIG. 12 shows a flow chart of an exemplary embodiment of a sensing method.

FIG. 12 shows an exemplary embodiment touch sensing method for the sensing device 3. Referring to FIGS. 3~4 and 12, the calculation unit 30 is coupled to the sensing array 4. The calculation unit 30 selects one sensing row among the sensing rows 4-1~4-N to serve as a sensing row to be detected for a sensing operation (step S10). For example, the sensing row 4-1 is selected to serve as a sensing row to be detected. The sensing operation performed to the sensing row 4-1 is described in the following. The calculation unit 30 extracts sensing data signals S4-1~S4-M from the sensing cells C4-1~C4-M in the sensing row 4-1 (step S11). The sensing data signals S4-1~S4-M respectively represent capacitance values related to the sensing cells C4-1~C4-M. The capacitance values change with an object being approaching the sensing cells C4-1~C4-M. The calculation unit 30 calculates the difference between every two sensing data signals among the sensing data signals S4-1~S4-M to obtain differential values D4-1~D4-X (X is a positive integer, and 1<x<M) (step S12). The calculation unit 30 obtains a sensing curve P40 corresponding to the sensing row 4-1, according to the differential values D4-1~D4-X (step S13).

Figure 13A:
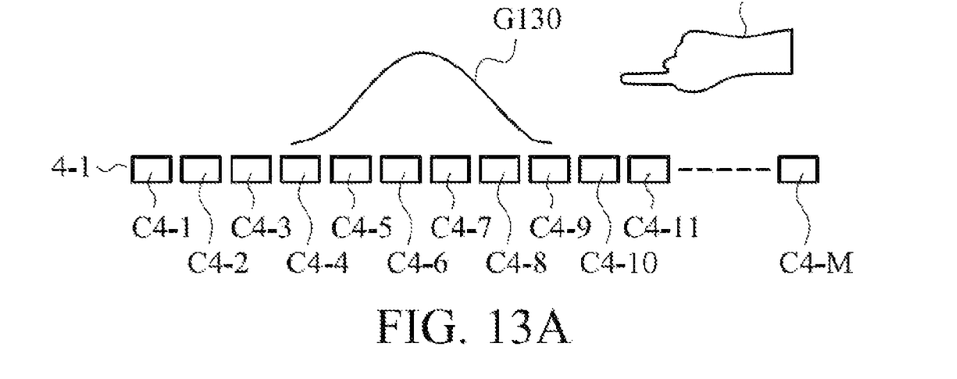
FIGS. 13A~13C show an exemplary embodiment of a touch condition of a sensing row and differential values, and a profile form corresponding to sensing data signals.
Figure 13B:
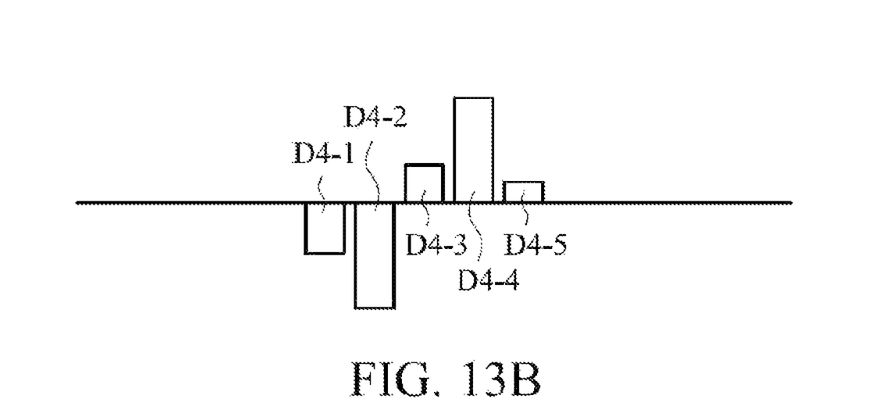
Figure 13C:
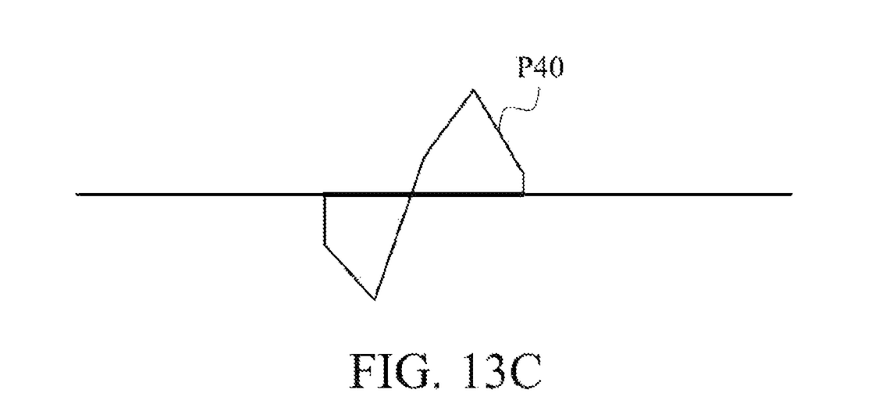

For example, referring to FIGS. 13A~13C, an exemplary embodiment of a touch condition of a sensing row and differential values and a profile form corresponding to sensing data signals is shown. When one single object 130 (such as finger, that is one single touch point) touches a position near to the sensing cells C4-6 and C4-7 in the sensing row 5-1, the intensity of the sensing data signals S4-1~S4-M read from the sensing cells C4-1~C4-M can be represented by a Gaussian Curve G130. The calculation unit 30 extracts sensing data signals S4-1~S4-M from the sensing cells C4-1~C4-M in the sensing row 4-1 (step S11) and calculates the difference between every two sensing data signals among the sensing data signals S4-1~S4-M to obtain the differential values D4-1~D4-X (step S12). The differential values D4-1~D4-5 shown in FIG. 13B are the meaningful differential values when one single object 130 touches the sensing row 4-1. For example, the differential value D4-1 is the difference between the sensing data signals S4-5 and S4-6 of the sensing cells C4-5 and C4-6, and the differential value D4-5 is the difference between the sensing data signals S4-6 and S4-7 of the sensing cells C4-6 and C4-7. The calculation unit 30 obtains a sensing curve P40 corresponding to the sensing row 4-1, according to the differential values D4-1~D4-5 (step S13). As shown in FIG. 13C, in the case, the profile form of the sensing curve P40 is represented by ▚▲.

Figure 14A:
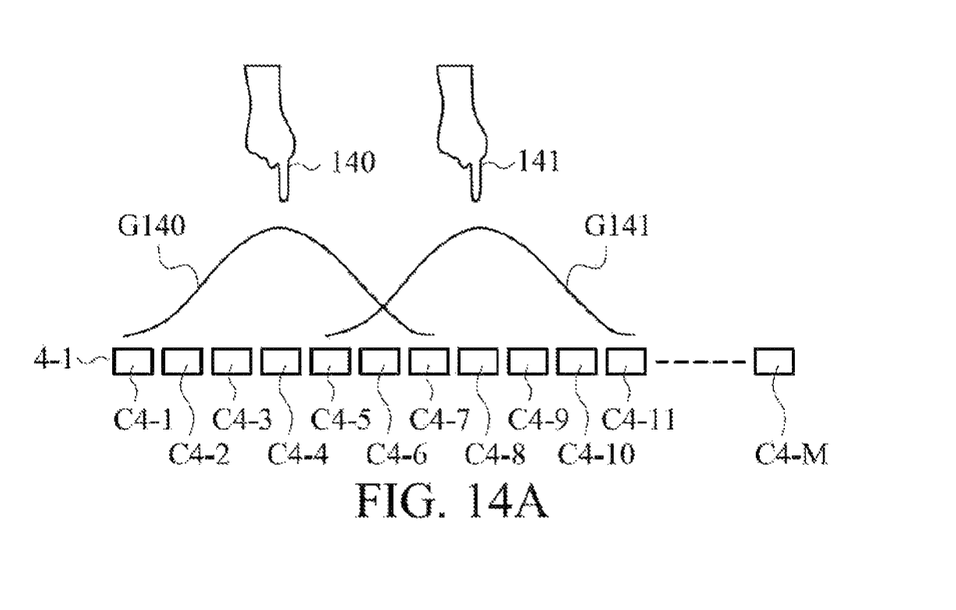
FIGS. 14A~14C show another exemplary embodiment of a touch condition of a sensing row and differential values, and a profile form corresponding to sensing data signals
Figure 14B:
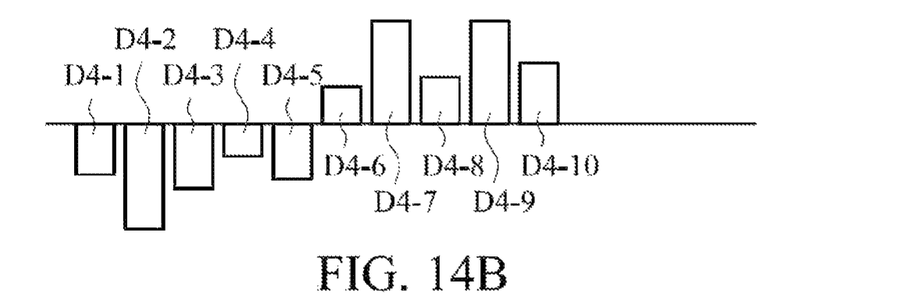
Figure 14C:
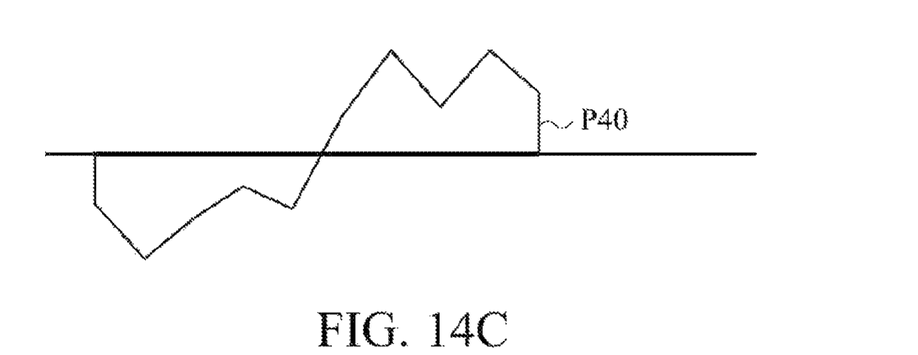

In some applications, the sensing row 4-1 may be touched by a plurality of objects. Referring to FIGS. 14A~14C, another exemplary embodiment of a touch condition of a sensing row and differential values and a profile form corresponding to sensing data signals is shown. For example, when one object 140 (such as a finger) touches a position near the sensing cells C4-4 in the sensing row 4-1, and another object 141 (such as an finger) touches a position near the sensing cells C4-8 in the sensing row 10, the intensity of the sensing data signals S4-1~S4-M read from the sensing cells C4-1~C4-M can be represented by two Gaussian Curves G140 and G141. The calculation unit 30 extracts sensing data signals S4-1~S4-M from the sensing cells C4-1~C4-M in the sensing row 4-1 (step S11) and calculates the difference between every two sensing data signals among the sensing data signals S4-1~S4-M to obtain the differential values D4-1~D4-X (step S12). The differential values D4-1~D4-10 shown in FIG. 14B are the meaningful differential values when the two objects 140 and 141 touch the sensing row 4-1. For example, the differential value D4-1 is the difference between the sensing data signals S4-1 and S4-2 of the sensing cells C4-1 and C4-2. The calculation unit 30 obtains a sensing curve P40 corresponding to the sensing row 4-1 according to the differential values D4-1~D4-10 (step S13). As shown in FIG. 14C, in the embodiment, when the two objects 140 and 141 (that is two touch points) touch the sensing row 4-1, there are two peak points in each of the two halves of the curve. For example, there are two peak points in the front half of the curve respectively corresponding to the differential values D4-2 and D4-5, and there are two peak points in the back half of the curve respectively corresponding to the differential values D4-7 and D4-9. However, in other cases (which two touch points occur), there are two peak points in only one of the two halves of the curve (the front or back of the curve).

After the sensing curve corresponding to the sensing row 4-1 is obtained, the curve processor 311 of the determination unit 31 can perform a perfection operation to the sensing curve (step S14). The perfection operation is not limited to conventional curve perfection manners (that is more obvious noise in the sensing curve is removed). In the embodiment, the curve processor 311 does not perform the perfection operation to each sensing curve. That is, the step S14 can be omitted. Then, the determination unit 31 determines whether a profile form (▚▲/▼▼▲▲) of the sensing curve P40 matches with one of the profile forms of the sensing curves P50. P60, P70, P80, P90, P10, and P11 stored in the memory 310 (step S15). When the determination unit 31 determinates that the profile form of the sensing curve P40 corresponding to the sensing row 4-1 matches with one of the profile forms of the sensing curves P50, P60, P70, P80, P90, P10, and P11 stored in the memory 310, the determination unit 31 notifies the detection unit 32 of the determination result. The determination result comprises that the sensing curve P40 corresponding to the sensing row 4-1 matches with which one predetermined profile form. The detection unit 32 detects the touch condition of the sensing row 4-1 according to the determination result related to the sensing row 4-1 (step S16). The touch condition of the sensing row 4-1 comprises whether the sensing row 4-1 has been touched by at least one object, the number of objects touching the sensing row 4-1, a position of at least one object in the sensing row 4-1 when the at least one object touches the sensing row 4-1, and/or a touched area in the sensing row 4-1 when at least one object touches the sensing row 4-1. After, the sensing device 3 ends the sensing operation.

For example, when the determination unit 31 determinates that the profile form of the sensing curve P40, corresponding to the sensing row 4-1, matches with the profile form ▚▲ of the sensing curve P60 stored in the memory 310, the detection unit 32 detects that the sensing row 4-1 is touched by one single object according to the determination result. As shown in FIG. 13A, the object 130 touches a position near the sensing cells C4-6 and C4-7 in the sensing row 4-1. Since the sensing curve P40 is obtained according to the meaningful differential values D4-1~D4-5, the detection unit 32 can obtain a touched position and a touched area of the single object when the single object touches the sensing row 4-1.

In another example, when the determination unit 31 determinates that the profile form of the sensing curve P40 corresponding to the sensing row 4-1 matches with the profile form ▼▼▲▲ of the sensing curve P11 stored in the memory 310, the detection unit 32 detects that the sensing row 4-1 is touched by two single objects according to the determination result. As shown in FIG. 14A, the object 140 touches a position near the sensing cell C4-4 in the sensing row 4-1, while the object 141 touches a position near the sensing cell C4-8 in the sensing row 4-1. Since the sensing curve P40 is obtained according to the meaningful differential values D4-1~D4-10, the detection unit 32 can obtain touched positions and touched areas of the two objects when the two objects touch the sensing row 4-1.

When the determination unit 31 determines that the profile form of the sensing curve corresponding to the sensing row 4-1 does not match one of the predetermined profile forms stored in the memory 310, the sensing operation is ended.

According to the above embodiment, after the determination unit 31 determines that the profile form of the sensing curve corresponding to the sensing row 4-1 does not match one predetermined profile forms stored in the memory 310 in the step S15 and after the detection step S16 for the sensing row 4-1, the sensing operation is ended. In some embodiments, after the determination unit 31 determines that the profile form of the sensing curve corresponding to the sensing row 4-1 does not match one predetermined profile forms stored in the memory 310 in the step S15, and after the detection step S16 for the sensing row 4-1, the sensing method returns back to the step S10, and the calculation unit 30 can continuously select another sensing row among the sensing rows 4-2~4-N to serve as the sensing row to be detected, and the sensing operation is performed again. For example, the calculation unit 30 selects the sensing row 4-2 next to the sensing row 4-1 to serve as the sensing row to be detected. The calculation unit 30, the determination unit 31, and the detection unit 32 perform the same operations as the steps S11~S16. When the detection unit 32 obtains the determination result related to at least two sensing rows among the sensing rows 4-2~4-N, some sensing rows among the sensing rows 4-2~4-N, or all of the sensing rows 4-2~4-N, the detection unit 32 can detect a touch condition of the sensing array 4 according to the determination result. The touch condition of the sensing array 4 comprises whether the sensing array 4 has been touched by at least one object, the number of objects touching the sensing array 4, a coordinate of at least one object in the sensing array 4 when the at least one object touches the sensing array 4, and/or a touched area in the sensing array 4 when at least one object touches the sensing array 4.

According to the above description, the sensing device 3 stores several types of predetermined profile forms in advance to be compared with the profile form of the sensing curve of the sensing row to be detected. By the comparison of the profile forms, the impact of interference noise can be reduced. Moreover, the sensing device 3 of the embodiment does not set the minimum threshold value. Thus, when the touched area of the sensing array 4 is small, the touch condition of the sensing array 4 can be accurately detected.

Moreover, according to the embodiments, when the size of an object that touched the sensing array 1 is larger (the size of the object is directly proportional to the touched area), and the distance between every two sensing cells in one sensing row is smaller, the sensing curve obtained by the determination unit 31 can conform to real touch operation of that the object touches the sensing cells more exactly, so that the touch condition of the sensing array 4, which is detected according to the sensing curve, can be more accurate.

While the invention has been described by way of example and in tennis of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A sensing method for detecting a sensing array which comprises at least one sensing row, the sensing method comprising:
   (a) obtaining a plurality of predetermined profile forms under a plurality of predetermined touch conditions respectively, wherein the step of obtaining each of the predetermined profile forms comprises:
   detecting a plurality of sensing data signals from the sensing row under one of the predetermined touch conditions,
   calculating the difference between every two sensing data signals among the plurality of sensing data signals to obtain a plurality of differential values, and
   obtaining one of the plurality of predetermined profile forms according to the plurality of differential values;
   (b) obtaining a first sensing curve according to a plurality of first sensing data signals extracted from the sensing row;
   (c) determining whether a profile form of the first sensing curve matches with one of the plurality of predetermined profile forms; and
   (d) obtaining a touch condition of the sensing row according to the result of the determination related to the sensing row based on the step (c), wherein obtaining the touch condition of the sensing row comprises determining at least one of whether the sensing row has been touched by at least one object, the number of objects touching the sensing row, a position of at least one object in the sensing row upon the at least one object touching the sensing row, and a touch area in the sensing row upon at least one object touching the sensing row.

2. The sensing method as claimed in claim 1, further comprising: performing a perfection operation to the first sensing curve.

3. The sensing method as claimed in claim 1, wherein the step (b)comprises:
   calculating the difference between every two sensing data signals among the plurality of first sensing data signals to obtain a plurality of differential values; and
   obtaining the first sensing curve according to the plurality of differential values.

4. The sensing method as claimed in claim 1, wherein the sensing row comprises a plurality of sensing cells, and the plurality of sensing data signals are extracted from the plurality of sensing cells respectively.

5. The sensing method as claimed in claim 4, wherein the plurality of sensing data signals represent capacitance values related to the plurality of sensing cells.

6. The sensing method as claimed in claim 1, wherein the sensing array comprises a plurality of sensing rows disposed successively, one sensing row being selected from the plurality of sensing rows each time to serve as a sensing row to be detected, and at least two sensing rows among the plurality of sensing rows being selected.

7. The sensing method as claimed in claim 6 further comprising: upon obtaining the result of the determination related to the at least two sensing rows among the plurality of sensing rows, obtaining a touch condition of the sensing array according to the result of the determination related to the at least two sensing rows.

8. The sensing method as claimed in claim 7, wherein obtaining the touch condition of the sensing array comprises determining at least one of whether the sensing array has been touched by at least one object, the number of objects touching the sensing array, a coordinate of at least one object in the sensing array upon the at least one object touching the sensing array, and a touched area in the sensing array upon at least one object touching the sensing array.

9. A sensing device for detecting a sensing array which comprises at least one sensing row, the sensing device comprising:
   a calculation unit for obtaining a first sensing curve according to a plurality of first sensing data signals extracted from the sensing row;

a determination unit comprising a memory for storing a plurality of predetermined profile forms, each of the predetermined profile form being generated by detecting a plurality of sensing data signals from the sensing row under one of a plurality of predetermined touch conditions, calculating the difference between every two sensing data signals among the plurality of sensing data signals to obtain a plurality of differential values, and obtaining one of the predetermined profile forms according to the plurality of differential values, wherein the determination unit determines whether a profile form of the first sensing curve matches with one of the plurality of predetermined profile forms; and a detection unit for obtaining a touch condition of the sensing array according to the result of the determination related to the selected sensing rows, wherein obtaining the touch condition of the sensing row comprises determining at least one of whether the sensing row has been touched by at least one object, the number of objects touching the sensing row, a position of at least one object in the sensing row upon the at least one object touching the sensing row, and a touch area in the sensing row upon at least one object touching the sensing row.

10. The sensing device as claimed in claim 9, wherein the determination unit comprises a curve processor for performing a perfection operation to the first sensing curve.

11. The sensing device as claimed in claim 9, wherein the calculation unit further calculates the difference between every two sensing data signals among the plurality of first sensing data signals to obtain a plurality of differential values, and wherein the determination unit obtains the first sensing curve according to the plurality of differential values.

12. The sensing device as claimed in claim 9, wherein the sensing row comprises a plurality of sensing cells, and the plurality of sensing data signals are extracted from the plurality of sensing cells respectively.

13. The sensing device as claimed in claim 12, wherein the plurality of sensing data signals represent capacitance values related to the plurality of sensing cells.

14. The sensing device as claimed in claim 9, wherein the sensing array comprises a plurality of sensing rows disposed successively, the calculation unit selecting one sensing row among the plurality of sensing rows each time to serve as a sensing row to be detected, and at least two sensing rows among the plurality of sensing rows being selected.

15. The sensing device as claimed in claim 14, wherein upon the determination unit obtaining the result of determination related to the at least two sensing rows among the plurality of sensing rows, the detection unit obtains a touch condition of the sensing array according to the result of determination related to the at least two sensing rows.

16. The sensing device as claimed in claim 15, wherein obtaining the touch condition of the sensing array comprises determining at least one of: whether the sensing array has been touched by at least one object, the number of objects touching the sensing array, a coordinate of at least one object in the sensing array upon the at least one object touching the sensing array, and a touched area in the sensing array upon at least one object touching the sensing array.

* * * * *